US010399128B2

(12) United States Patent
Wolf et al.

(10) Patent No.: US 10,399,128 B2
(45) Date of Patent: Sep. 3, 2019

(54) SYSTEM AND METHOD FOR CLEANING AN OBJECT

(71) Applicant: ILLINOIS TOOL WORKS INC., Glenview, IL (US)

(72) Inventors: Rory A. Wolf, Richfield, WI (US); Stephen Frank Mitchell, Kilmacolm (GB); Sheila Hamilton, Kilmacolm (GB)

(73) Assignee: Illinois Tool Works Inc., Glenview, IL (US)

( * ) Notice: Subject to any disclaimer, the term of this patent is extended or adjusted under 35 U.S.C. 154(b) by 242 days.

(21) Appl. No.: 15/315,883

(22) PCT Filed: Jun. 5, 2014

(86) PCT No.: PCT/US2014/041008
§ 371 (c)(1),
(2) Date: Dec. 2, 2016

(87) PCT Pub. No.: WO2015/187161
PCT Pub. Date: Dec. 10, 2015

(65) Prior Publication Data
US 2017/0113254 A1    Apr. 27, 2017

(51) Int. Cl.
*B08B 7/00* (2006.01)
*B08B 1/00* (2006.01)
(Continued)

(52) U.S. Cl.
CPC ............ *B08B 7/0035* (2013.01); *B08B 1/006* (2013.01); *B08B 1/007* (2013.01); *B08B 7/0028* (2013.01);
(Continued)

(58) Field of Classification Search
CPC ..... B08B 1/007; B08B 7/0028; B08B 7/0035; B08B 1/006; G02F 1/133528; G02F 2001/1316
See application file for complete search history.

(56) References Cited

U.S. PATENT DOCUMENTS 5,529,631 A * 6/1996 Yoshikawa .............. B05D 1/62
118/50.1
6,082,292 A * 7/2000 Denes ..................... B29C 59/14
118/718
(Continued)

FOREIGN PATENT DOCUMENTS

CN    102224287    10/2011
CN    102361703    2/2012
(Continued)

OTHER PUBLICATIONS

International Search Report corresponding to International Patent Application No. PCT/US2014/041008, dated Aug. 21, 2014.
(Continued)

*Primary Examiner* — Alexander Markoff
(74) *Attorney, Agent, or Firm* — McAndrews, Held & Malloy, Ltd.

(57) ABSTRACT

A system (10) for cleaning an object (12) includes a roll cleaner (14) having a rotatable elastomeric roll (20) with a cylindrical outer surface configured to contact the first surface of the object (12), a rotatable adhesive roll (22) with a cylindrical outer surface contacting a portion of the outer surface of the elastomeric roll (20), and a support (24). The object (12) passes between the elastomeric roll (20) and the support (24), which contacts a second, opposing object surface. An atmospheric plasma cleaner (16) includes a sealed chamber (32) and at least one electrode (34) disposed in the chamber (32) and receiving a high voltage to generate a plasma applied to the first object surface. At least a portion
(Continued)

of an inlet of the plasma cleaner (16) is formed by the elastomeric roll (20) and the support (24), and the contacting of the first and second surfaces of the object (12) by the elastomeric roll (20) and the support (24) seals the inlet of the plasma cleaner (16).

16 Claims, 3 Drawing Sheets

(51) Int. Cl.
    *G02F 1/1335*     (2006.01)
    *G02F 1/13*     (2006.01)
(52) U.S. Cl.
    CPC ............... *G02F 1/133528* (2013.01); *G02F 2001/1316* (2013.01)

(56) References Cited

U.S. PATENT DOCUMENTS

| | | | |
|---|---|---|---|
| 2003/0116281 A1* | 6/2003 | Herbert | H01J 7/32743 |
| | | | 156/379.6 |
| 2005/0145174 A1* | 7/2005 | Chaleix | B08B 7/0035 |
| | | | 118/723 R |
| 2006/0254419 A1* | 11/2006 | Leonard | H01G 7/02 |
| | | | 95/57 |
| 2007/0154650 A1* | 7/2007 | Wu | B29C 59/14 |
| | | | 427/532 |
| 2007/0246064 A1* | 10/2007 | Jackson | B08B 7/0021 |
| | | | 134/1.2 |
| 2010/0105830 A1* | 4/2010 | Kaneko | B29C 41/28 |
| | | | 524/599 |
| 2012/0205387 A1* | 8/2012 | Manabe | B32B 7/12 |
| | | | 220/626 |
| 2012/0291706 A1* | 11/2012 | Kobayashi | H05H 1/2406 |
| | | | 118/723 E |
| 2013/0084409 A1* | 4/2013 | Vangeneugden | B29C 59/14 |
| | | | 427/569 |
| 2013/0213575 A1* | 8/2013 | Kim, II | H05H 1/46 |
| | | | 156/345.44 |
| 2014/0123854 A1* | 5/2014 | Leonard | B03C 3/30 |
| | | | 96/28 |
| 2015/0162408 A1* | 6/2015 | Hong | B29B 15/08 |
| | | | 257/29 |
| 2015/0268383 A1* | 9/2015 | Domash | G02B 1/118 |
| | | | 359/601 |
| 2016/0329193 A1* | 11/2016 | Sieber | H01J 7/32449 |

FOREIGN PATENT DOCUMENTS

| | | |
|---|---|---|
| CN | 202683514 | 1/2013 |
| CN | 103222086 | 7/2013 |
| CN | 103402768 | 11/2013 |
| EP | 0 214 741 | 3/1987 |
| JP | 2003027234 | 1/2003 |
| WO | 2012/079713 | 6/2012 |

OTHER PUBLICATIONS

Japanese Office Action Appln No. 2016-571264 dated May 8, 2018 (2 pages).

* cited by examiner

SYSTEM AND METHOD FOR CLEANING AN OBJECT

BACKGROUND OF THE INVENTION

Embodiments of the present invention relate generally to a system for cleaning the surface of an object, and more particularly, to a system that removes both organic and inorganic contaminants from the surface of the object.

In manufacturing, for various reasons, many components require cleaning prior to assembly. For example, liquid crystal display (LCD) panels available in televisions, monitors, tablets, phones, and the like require optical polarizing films. These films must be thoroughly cleaned so that contaminants do not degrade or compromise the image quality of the overall LCD panel.

The films are often provided on rolls as continuous webs. Systems exist which are capable of cleaning one or both surfaces of the web by removing inorganic and other contaminants down to the micron level. However, such systems are incapable of removing contaminants down to a nanometer scale, such as oligomers, which are not particles per se, but organic chemical conglomerations.

A different type of technology, atmospheric plasma cleaners, is used in other fields (e.g., commercial inks and coatings) to eliminate such organic contaminants. A plasma cleaner generates a plasma through air ionization and passes a material surface through the plasma, which effectively vaporizes or tears apart the oligomers or other organic contaminants.

It is desirable to provide an integrated system capable of removing both organic and inorganic contaminants from a surface of an object at a scale down to at least tens of nanometers.

BRIEF SUMMARY OF THE INVENTION

Briefly stated, an embodiment of the present invention comprises a system for cleaning an object. The system includes a roll cleaner configured to remove inorganic contaminants from a first surface of the object. The roll cleaner includes at least one elastomeric roll rotatably mounted to the roll cleaner and having a generally cylindrical outer surface configured to contact the first surface of the object for removing the inorganic contaminants, at least one adhesive roll rotatably mounted to the roll cleaner and having a generally cylindrical outer surface in contact with a portion of the outer surface of the at least one elastomeric roll, and a first support. The object passes between the at least one elastomeric roll and the first support such that the first support is in contact with a second, opposing surface of the object. An atmospheric plasma cleaner is configured to remove organic contaminants from the first surface of the object. The plasma cleaner includes a sealed chamber having an inlet and an outlet for respectively receiving and discharging the object, and at least one electrode disposed in the chamber and receiving a high voltage to generate a plasma applied to the first surface of the object. At least a portion of the inlet of the plasma cleaner is formed by the at least one elastomeric roll and the first support, and the contacting of the first and second surfaces of the object by the elastomeric roll and the first support seals the inlet of the plasma cleaner.

Another embodiment of the invention comprises a method for cleaning an object. The method includes receiving the object in a roll cleaner. The roll cleaner includes at least one rotatable elastomeric roll, at least one rotatable adhesive roll in contact therewith, and a first support. The method further includes contacting a first surface of the object with the at least one elastomeric roll to remove inorganic contaminants from the first surface of the object, and contacting the second surface of the object with the first support, passing the object from the at least one elastomeric roll and the first support into a sealed chamber of an atmospheric plasma cleaner having at least one electrode disposed therein, and applying a high voltage to the at least one electrode to generate a plasma that removes organic contaminants from the first surface of the object. The contacting of the first and second surfaces of the object by the at least one elastomeric roll and the first support provides a seal for the chamber of the plasma cleaner.

BRIEF DESCRIPTION OF THE SEVERAL VIEWS OF THE DRAWINGS

The foregoing summary as well as the following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
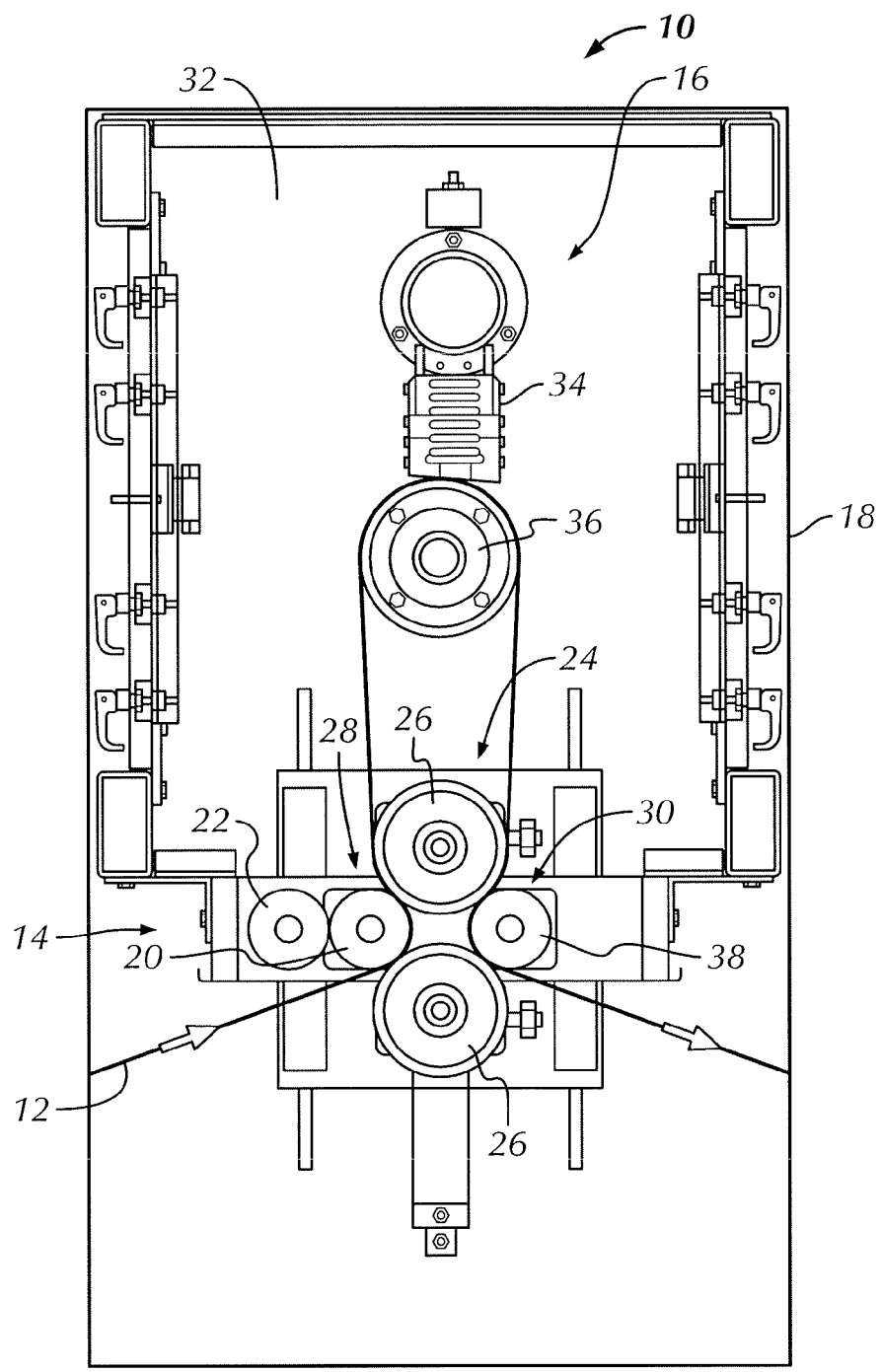
FIG. 1 is a partially cut-away side elevation view of a film cleaning system in accordance with a first preferred embodiment of the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the device and designated parts thereof. Unless specifically set forth herein, the terms "a", "an" and "the" are not limited to one element but instead should be read as meaning "at least one". The terminology includes the words noted above, derivatives thereof and words of similar import.

Referring to the drawings, wherein the same reference numerals are used to designate the same components throughout the several figures, there is shown in FIG. 1 a first embodiment of a system 10 for cleaning an object 12 in accordance with the invention. In the particular embodiment shown in FIG. 1, the object 12 is a continuous moving web or film of material. For example, the web 12 may be a polymeric sheet of material of the like. However, the object 12 may instead be a discrete film, sheet, screen, or the like.

The system 10 includes a roll cleaner 14 that is configured to remove inorganic contaminants (e.g., particles) from one or more surfaces of the object 12, as well as an atmospheric plasma cleaner 16 that is configured to remove organic contaminants (e.g., oligomers and the like) from the one or more surfaces of the object 12. The roll cleaner 14 and the plasma cleaner 16 are preferably contained within a single housing 18, although the housing 18 may have distinct compartments (not shown) containing the various components. Alternatively, the roll cleaner 14 and the plasma cleaner 16 may each be contained in separate housings (not shown) which may be attached to one another or spaced apart, depending on the desired application.

The roll cleaner 14 preferably includes at least one elastomeric roll 20 rotatably mounted thereto. The elastomeric roll 20 generally includes a metal shaft covered by an elastomer coating. For example, one such type of elastomeric roll 20 is available from TEKNEK LTD. The elastomeric roll 20 has a generally cylindrical outer surface extending along a longitudinal axis thereof. As the object 12 moves through the roll cleaner 14, the outer surface of the elastomeric roll 20 is configured to rotate and contact a surface of the object 12 for removing the inorganic contaminants. As is generally known, the force applied by the elastomeric roll 20 to the contaminants on the object 12 must be greater than the force keeping the contaminants on the object 12. However, the applied force must not be so great as to attach, warp, or otherwise disrupt the object 12 or movement thereof.

In conjunction with the elastomeric roll 20, at least one adhesive roll 22 is also required to be rotatably mounted in the roll cleaner 14. The adhesive roll 22 generally includes a polymeric base coated with an adhesive material, such as an acrylic, pressure-sensitive type or the like. Such adhesive rolls 22 are also available from TEKNEK LTD. The adhesive roll 22 also has a generally cylindrical outer surface extending along a longitudinal axis thereof, and is rotatable with respect to the at least one elastomeric roll 20. In operation, the outer surface of the adhesive roll 22 rotates and contacts the outer surface of the elastomeric roll 20 at a location rotationally downstream of the contact point between the elastomeric roll 20 and the object 12. In this way, contaminants removed from the object 12 and adhered to the elastomeric roll 20 can be removed by the adhesive roll 22. As is known, the force applied by the adhesive roll 22 to the elastomeric roll 20 should be greater than the force maintaining the contaminant on the elastomeric roll 20.

In a preferred embodiment, the adhesive roll 22 is movable toward and away from the outer surface of the elastomeric roll 20 so that when the roll cleaner 14 is not in operation the outer surfaces of the adhesive roll 22 and the elastomeric roll 20 are not in contact with one another. This prevents any transfer of the adhesive to the outer surface of the elastomeric roll 20 during extended periods of inactivity.

It is preferred that a surface of the object 12 opposite to the surface contacted by the elastomeric roll 20 be supported during cleaning. Thus, a first support 24 is provided such that the object 12 passes between the elastomeric roll 20 and the first support 24. It is preferred that the first support 24 is at least one process roll 26. For example, in the embodiment shown in FIG. 1, the first support 24 is formed by two process rolls 26 that are aligned with respect to each other in a direction perpendicular to an axis of rotation of each. The axes of rotation of each of the two process rolls 26 are also each parallel to the axis of rotation of the elastomeric roll 20 and are offset therefrom by about 45°. In this embodiment, the elastomeric roll 20 makes contact with a surface of the object 12 at two different points, i.e., where the elastomeric roll 20 interfaces with each of the two process rolls 26. In an alternative embodiment (not shown), two elastomeric rolls 20 may be used, each contacting one of the process rolls 26.

The object 12 moves from the roll cleaner 14 downstream into the plasma cleaner 16. The plasma cleaner 16 includes an inlet 28 and an outlet 30 for a sealed chamber 32. The chamber 32 is preferably kept at substantially atmospheric pressure, but the chamber 32 is kept sealed to maintain an appropriate gaseous mixture for operation. For example, it is preferred that the environment within the plasma cleaner 16 be substantially oxygen free. The chamber 32 houses at least one electrode 34, which may be metal, ceramic, or other type of conductive material, coupled to a power supply (not shown) that provides a high voltage to the electrode 34 to generate a plasma. The plasma is applied to the surface of the passing object 12 to remove the organic contaminants disposed thereon which survived the roll cleaning. To generate the plasma, a voltage of about 10 kV or higher is typically required, depending on, among other factors, the shape of the electrode and the dielectric breakdown voltage of the surrounding medium.

A grounded electrode is also required for the plasma cleaner 16. In the embodiment shown in FIG. 1, a rotatable ground roll 36 is provided in the chamber 32 and is coupled to ground. The ground roll 36 supports the object 12 within the chamber 32 and is preferably arranged such that the surface of the object 12 to be treated is less than 0.1 inches from the electrode 34. In applications where both surfaces of the object 12 are to be treated, two ground rolls 36 may be provided corresponding to two different electrodes 34 which apply plasma to the opposing sides of the object 12.

It is preferred that at least a portion of the inlet 29 to the sealed chamber 32 is formed by the combination of the elastomeric roll 20 and the first support 24 of the roll cleaner 14. Specifically, the contacting of the object 12 by the elastomeric roll 20 and the first support 26 preferably provides the seal for the chamber 32 on the inlet 28 side. That is, the pressure applied by the elastomeric roll 20 and the first support 26 (in FIG. 1, one or both of the process rolls 26) on the object 12 is sufficient to contain the atmosphere within the chamber 32.

At the outlet 30 of the chamber 32, a similar configuration may be supplied. For example, an idler roll 38 may be provided at the outlet 30 to discharge the object 12 from the chamber 32. The idler roll 38 may cooperate with another support to seal the outlet 30. In FIG. 1, the idler roll 38 is arranged proximate the two process rolls 26 in a configuration symmetric to the elastomeric roll 20 on the opposite side. As with the elastomeric roll 20, contacting of the object 12 by the idler roll 38 and the first support 24 (i.e., two process rolls 26) provides the necessary seal.

In operation, the object 12 enters the housing 18 and proceeds between the elastomeric roll 20 and the lower process roll 26 as a first pass to remove inorganic contaminants from the first (e.g., top) surface of the object 12. The object then passes between the elastomeric roll 20 and the upper process roll 26 as a second pass to remove the inorganic contaminants from the top surface, and subsequently enters the chamber 32 of the plasma cleaner 16. The object 12 wraps around the ground roll 36, passing beneath the electrode 34 and through the plasma. The object 12 proceeds between the idler roll 38 and the upper process roll 26, and the idler roll 38 thereafter passes the object 12 over the lower process roll 26 and out of the chamber 32. The object 12 can subsequently exit the housing 18 and continue to further downstream processing.

Figure 2:
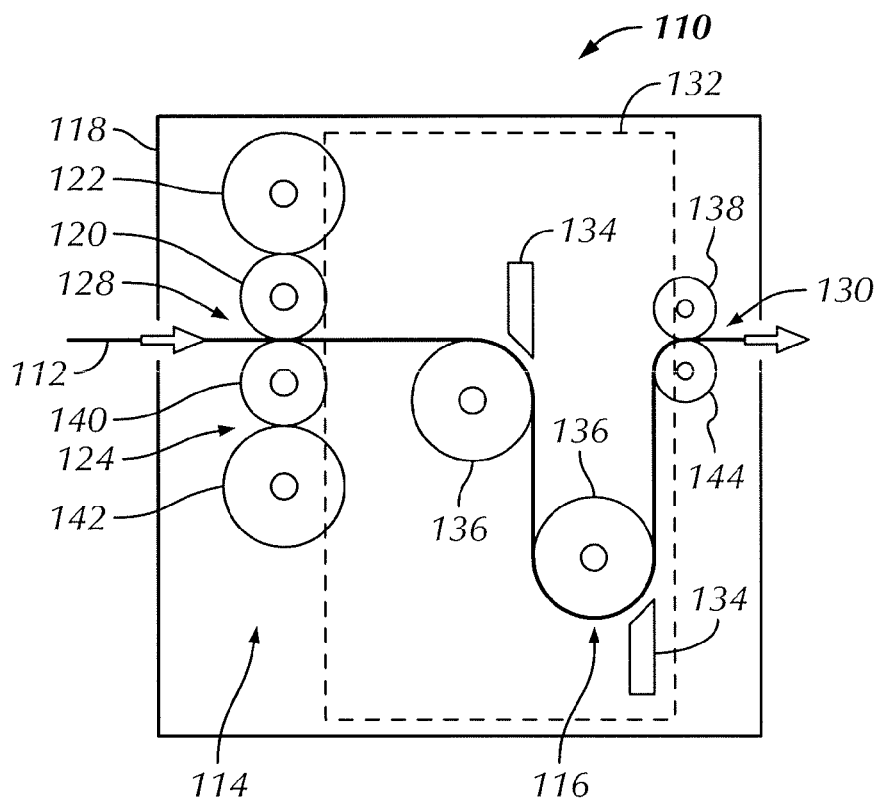
FIG. 2 is a schematic view of a film cleaning system in accordance with a second preferred embodiment of the present invention.

FIG. 2 shows a second embodiment of the system 110. The second embodiment is similar to the first embodiment described above. Like numerals have been used for like elements, except the 100 series numerals have been used for the second embodiment. Accordingly, a complete description of the second embodiment has been omitted, with only the differences being described.

In the embodiment shown in FIG. 2, an elastomeric roll 120 and corresponding adhesive roll 122 are provided as before. However, the first support 124 is formed by a second elastomeric roll 140 contacting an opposite surface of the object 112. In this embodiment, both surfaces of the object 112 are cleaned by the system 110. A second adhesive roll 142 is further provided in contact with the second elastomeric roll 140. In the embodiment shown in FIG. 2, the axes of rotation of the elastomeric rolls 120, 140 and the adhesive rolls 122, 142 are aligned in a single plane. However, other configurations can be made depending on spacing issues, direction of entry of the object 112, and other like concerns. As with the first embodiment, the seal for the inlet 128 of the sealed chamber 132 is provided by the contacting of the opposing surfaces of the object 112 by the elastomeric rolls 120, 140.

Further, the plasma cleaner 116 provides two ground rolls 136 and two electrodes 134 for cleaning opposing surfaces of the object 112. In this embodiment, the outlet 130 of the chamber 132 is provided by the idler roll 138 and a second support in the form of a second idler roll 144. Since both surfaces of the object 112 are treated in the second embodiment, it is important that both idler rolls 138, 144 are clean and do not contaminate the object following operation of the plasma cleaner 116.

Figure 3:
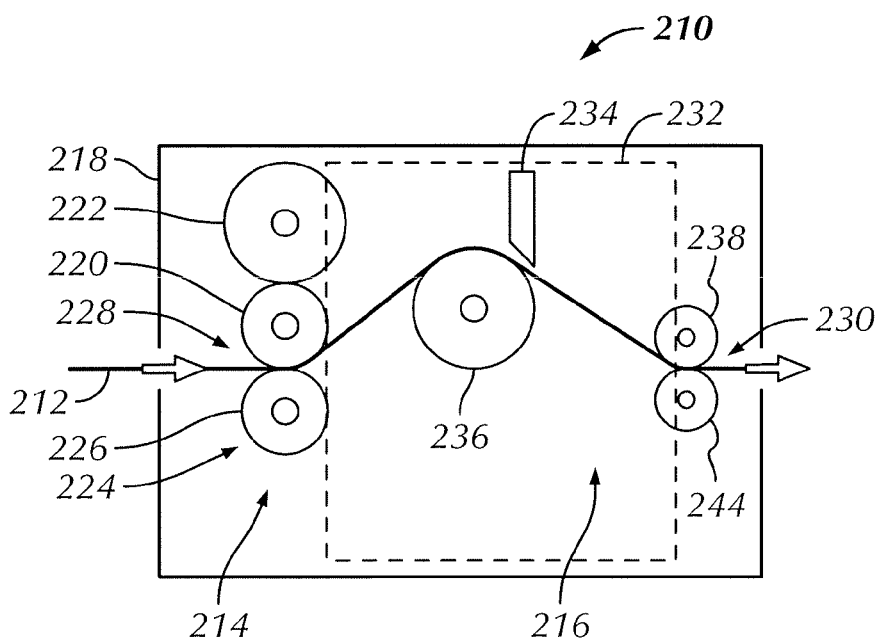
FIG. 3 is a schematic view of a film cleaning system in accordance with a third preferred embodiment of the present invention.

FIG. 3 shows a third embodiment of the system 210. The third embodiment is similar to the first and second embodiments described above. Like numerals have been used for like elements, except the 200 series numerals have been used for the third embodiment. Accordingly, a complete description of the third embodiment has been omitted, with only the differences being described.

In the embodiment shown in FIG. 3, an elastomeric roll 220 and corresponding adhesive roll 222 are provided as before. However, the first support 224 is formed by a single process roll 226 contacting an opposite surface of the object 212. The axes of rotation of the elastomeric roll 220, the adhesive roll 222, and the support roll 226 are preferably aligned in a single plane. However, other configurations can be made depending on spacing issues, direction of entry of the object 212, and other like concerns. As with the first embodiment, the seal for the inlet 228 of the sealed chamber 232 is provided by the contacting of the opposing surfaces of the object 112 by the elastomeric roll 220 and the process roll 226. Like the second embodiment, a second idler roll 244 is provided at the outlet 230 of the chamber 232.

Figure 4:
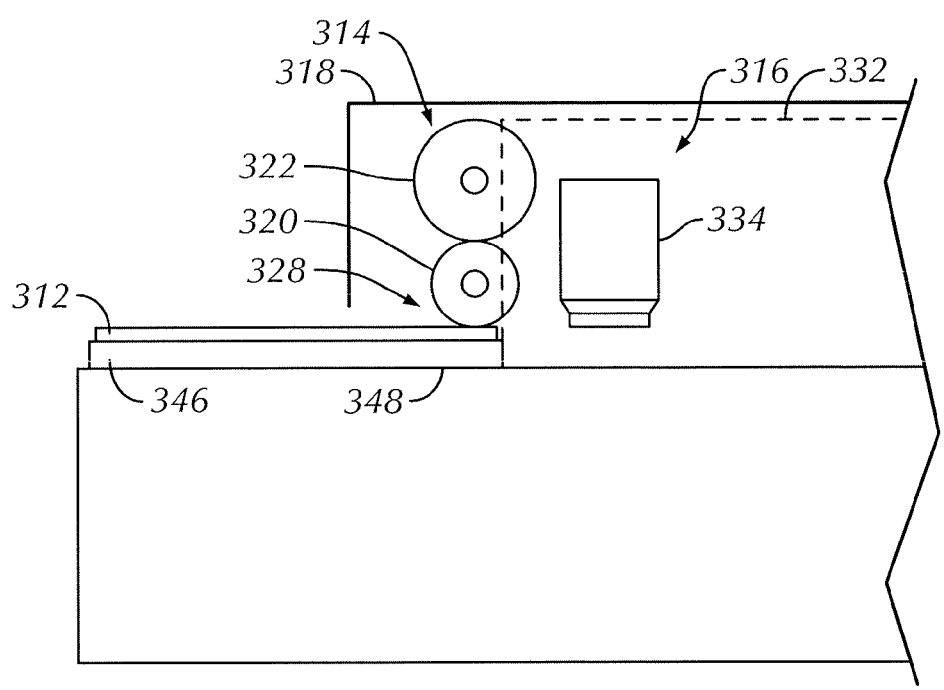
FIG. 4 is a schematic view of a film cleaning system in accordance with a fourth preferred embodiment of the present invention.

FIG. 4 shows a fourth embodiment of the system 310. The fourth embodiment is similar to the first through third embodiments described above. Like numerals have been used for like elements, except the 300 series numerals have been used for the fourth embodiment. Accordingly, a complete description of the third embodiment has been omitted, with only the differences being described.

In the embodiment shown in FIG. 4, the object 312 is in the form of a discrete film or sheet and is mounted with one surface thereof on an indexing plate 346. An elastomeric roll 320 and corresponding adhesive roll 322 are provided as before. The first support 324 is formed by a combination of the indexing plate 346 and a conveyor 348. The seal for the inlet 328 may be provided by the elastomeric roll 320 and the first support 326, although since the object 312 is not a continuous web in this embodiment, it may be necessary to provide additional sealing structure (not shown) for the chamber 332. Also in this embodiment, no ground roll is provided in the chamber 332. Rather, the object 312 is carried by the conveyor 348 past the electrode 334. The conveyor 348 and/or the indexing plate 346 may function as a ground in this embodiment.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A system for cleaning an object, the system comprising:
   (a) a roll cleaner configured to remove inorganic contaminants from a first surface of the object, the roll cleaner including:
      (i) at least one elastomeric roll rotatably mounted to the roll cleaner and having a generally cylindrical outer surface configured to contact the first surface of the object for removing the inorganic contaminants,
      (ii) at least one adhesive roll rotatably mounted to the roll cleaner and having a generally cylindrical outer surface in contact with a portion of the outer surface of the at least one elastomeric roll, and
      (iii) a first support, the object passing between the at least one elastomeric roll and the first support such that the first support is in contact with a second, opposing surface of the object; and
   (b) an atmospheric plasma cleaner configured to remove organic contaminants from the first surface of the object, the plasma cleaner including:
      (i) a sealed chamber having an inlet and an outlet for respectively receiving and discharging the object, and
      (ii) at least one electrode disposed in the chamber and receiving a high voltage to generate a plasma applied to the first surface of the object,
   wherein at least a portion of the inlet of the plasma cleaner is formed by the at least one elastomeric roll and the first support, and wherein the contacting of the first and second surfaces of the object by the elastomeric roll and the first support seals the inlet of the plasma cleaner.

2. The system of claim 1, wherein the first support is at least one process roll.

3. The system of claim 2, wherein the first support is two process rolls that are aligned with respect to each other in a direction perpendicular to an axis of rotation of each of the two process rolls, the axis of rotation of each of the two process rolls being parallel to and offset by about 45° from an axis of rotation of the at least one elastomeric roll.

4. The system of claim 3, wherein at least a portion of the outlet of the plasma cleaner is formed by an idler roll and one of the first support or a second support, the object passing between the idler roll and the one of the first support or the second support such that the idler roll contacts the first surface of the object and the one of the first support or the second support contacts the second surface of the object, and wherein the contacting of the first and second surfaces of the object by the idler roll and the one of the first support or the second support seals the outlet of the plasma cleaner.

5. The system of claim 4, wherein the idler roll is oriented such that a rotation axis thereof is parallel to and offset by about 45° from the axis of rotation of each of the two process rolls.

6. The system of claim 1, wherein the at least one elastomeric roll is a first elastomeric roll, and the first support includes a rotatable second elastomeric roll configured to remove inorganic contaminants from the second surface of the object.

7. The system of claim 6, further comprising a second rotatable adhesive roll in contact with the second elastomeric roll.

8. The system of claim 1, further comprising:
(c) a rotatable ground roll arranged in the chamber of the plasma cleaner and coupled to ground, the ground roll being in contact with the second surface of the object as the at least one electrode generates the plasma to clean the first surface of the object.

9. The system of claim 1, wherein the at least one electrode is made from one of a metal material or a ceramic material.

10. The system of claim 1, wherein the object is a continuous web.

11. The system of claim 1, wherein the chamber of the plasma cleaner is held at substantially atmospheric pressure.

12. A method for cleaning an object, the method comprising:
(a) receiving the object in a roll cleaner, the roll cleaner including at least one rotatable elastomeric roll, at least one rotatable adhesive roll in contact therewith, and a first support;
(b) contacting a first surface of the object with the at least one elastomeric roll to remove inorganic contaminants from the first surface of the object, and contacting the second surface of the object with the first support;
(c) passing the object from the at least one elastomeric roll and the first support into a sealed chamber of an atmospheric plasma cleaner having at least one electrode disposed therein; and
(d) applying a high voltage to the at least one electrode to generate a plasma that removes organic contaminants from the first surface of the object,
wherein the contacting of the first and second surfaces of the object by the at least one elastomeric roll and the first support provides a seal for the chamber of the plasma cleaner.

13. The method of claim 12, further comprising:
(e) following organic contaminant removal, contacting the first surface of the object with an idler roll and the second surface of the object with one of the first support or a second support to output the object and create a seal for the plasma chamber.

14. The method of claim 12, wherein the at least one elastomeric roll is a first elastomeric roll, and the first support includes a rotatable second elastomeric roll, the method further comprising:
(e) contacting the second surface of the object with the second elastomeric roll to remove inorganic contaminants from the second surface of the object.

15. The method of claim 12, wherein the plasma cleaner has a rotatable ground roll arranged in the sealed chamber proximate the at least one electrode, the method further comprising:
(e) contacting the ground roll to the second surface of the object.

16. The method of claim 12, further comprising:
(e) maintaining the sealed chamber at substantially atmospheric pressure.

* * * * *